United States Patent Office 2,971,847
Patented Feb. 14, 1961

2,971,847

CREAMED COTTAGE CHEESE

Frederick J. Babel, West Lafayette, Ind., and Donald W. Mather, Walton, N.Y., assignors to Research Corporation, New York, N.Y., a corporation of New York No Drawing. Filed Nov. 18, 1958, Ser. No. 774,606

16 Claims. (Cl. 99—116)

This invention relates to an improved creamed cottage cheese composition and to a method of making it.

A principal object of the invention is the provision of a method for producing creamed cottage cheese of improved flavor and keeping quality. Other objects and advantages of the invention will appear from the following description of the invention.

Experience has shown that creamed cottage cheese varies greatly in flavor and this is confirmed by a test program in which it was found that some samples of creamed cottage cheese were almost devoid of flavor, others had a pronounced sour flavor and some had a flavor suggesting biacetyl. When biacetyl was present, it appeared to mask the sour flavor. It was also noted that cottage cheese and creamed cottage cheese were extremely variable in their biacetyl contents even though manufactured in the same plant, by the same personnel and by the same procedure.

As a result of experimental work directed to finding a method of overcoming the non-uniformity of flavor of creamed cottage cheese, we found that by creaming cottage cheese with a culture of citric acid-fermenting organisms in milk or a milk fraction containing added citric acid, the resulting creamed cottage cheese had a uniform, pleasing and stable flavor. It was also found that the creamed cottage cheese thus produced had greatly improved keeping qualities.

It is believed that the improved flavor is largely due to the biacetyl content introduced by the cultures. The improved keeping quality of the creamed cottage cheese is believed to be due in part to the volatile acid content, largely actic and propionic acid of the cultures, which are known to be inhibitors of mold and slime formation.

The citric accid fermenting organisms which have been found to be particularly useful in the method of the invention are *Leuconostoc citrovorum* (also known as *Streptococcus citrovorus*) and *Leuconostoc dextranicum* (also known as *Streptococcus paracitrovorus*). Pure cultures of the citric acid-fermenting organisms should be used. Absence of lactic acid-producing organisms such as *Streptococcus lactis* or *Streptococcus cremoris* is particularly important as excessive lactic acid is objectionable in creamed cottage cheese.

The citric acid-fermenting organisms will grow over a temperature range of 8° C. to 45° C. Their optimum temperature range is 25° C. to 30° C. We prefer to grow the culture at about 25° C.

After sufficient growth of the citric acid-fermenting organisms has taken place, citric acid is added, and the fermentation allowed to proceed at a temperature of 21° to 25° C. The fermentation will take place over the same range as the growth temperature (8° to 45° C.) and also at a temperature as low as 5° C.

The substrate, or growth medium, for the citric acid-fermenting bacteria may be skimmilk, milk, or mixtures of skimmilk and milk, skimmilk and cream, or milk and cream.

The growth medium is heated to 200° F. (93.3° C.) and held at that temperature for one hour, or it may be heated under 15 pounds' steam pressure for 15 to 20 minutes.

After heating, the growth medium is cooled to 21° to 25° and inoculated with 1 to 2 percent of a culture of the citric acid-fermenting organisms. Then the medium is held at 21° to 25° C. for 24 to 48 hours to permit sufficient growth of the organisms. Following incubation, the medium is adjusted to about pH 4.3 with a sterile citric acid solution containing 15% citric acid. The medium is again incubated at 21° to 25° C. for about 24 hours to permit fermentation of the citric acid. The medium then is ready for use.

The citric acid-fermenting organisms may be grown in a substrate consisting of whole milk, skimmilk plus added cream or whole milk plus added cream, which is heated before inoculation with the pure culture of the citric acid-fermenting organism to a temperature sufficient to destroy most of the original bacterial flora. However, when cream is heated to a high temperature, the fat has a tendency to separate as an oily layer. It is, therefore, preferable to grow the organism in a substrate of sterilized skimmilk and after the fermentation of the citric acid is substantially complete mix the culture with cream in the desired amount to produce a creaming composition.

One of the advantages of the method of the invention is that the flavor of creamed cottage cheese can be standardized in several ways. For example, if the substrate or growth medium is skimmilk, it could be used in the following amounts in preparing a creaming mixture containing 12% fat:

12 parts 20% fat cream plus 8 parts culture
12 parts 30% fat cream plus 18 parts culture
12 parts 40% fat cream plus 28 parts culture If the substrate or growth medium is milk containing 4% fat, it can be used as follows:

8 parts 20% fat cream plus 8 parts culture
8 parts 30% fat cream plus 18 parts culture
8 parts 40% fat cream plus 28 parts culture The creaming mixture used for cottage cheese generally contains about 12% fat. Cottage cheese is mixed with a creaming mixture (12%) in the proportion of 2 parts by weight of cottage cheese to 1 part by weight of 12% creaming mixture. This gives creamed cottage cheese with 4% fat, which is the Federal Standard. If a creamed cottage cheese is desired that will show little free cream, the fat content of the creaming mixture can be increased. For example, if a 16% fat creaming mixture were used, it would be added at the rate of 1 part by weight of creaming mixture to 3 parts by weight of cheese.

The amount of culture in the creaming mixture can be varied according to the amount of flavor compounds present. We have found a creaming mixture containing 12% fat, made up of 12 parts of 20% cream plus 8 parts culture (skimmilk) to be suitable.

In order to provide a creaming mixture that is smooth in body and texture, the mixture of culture and cream can be passed through a homogenizer using about 500 pounds' pressure per square inch.

The following is an illustrative example of the method of the invention:

Sterile skimmilk at a temperature of 70° F. (21.1° C.) was inoculated with 2% of a pure culture of *Leuconostoc citrovorum* and the culture medium was incubated at 70° F. for one day. The culture medium was then acidified to pH 4.3 with a sterile aqueous solution of citric acid and further incubated at 70° F. for about 17 hours. The culture was then mixed with cream containing 20% milkfat in the proportion of 12 parts of cream to 8 parts of skimmilk to obtain a creaming composition containing 12% of milk fat.

The creaming mixture was added to cottage cheese in sufficient quantity to bring the creamed cottage cheese to a milkfat content of 4%. The creamed cottage cheese was salted at the rate of 1% by weight. The following table gives the pH, and the biacetyl ($ac^2$) and acetylmethylcarbinol (amc) contents of the uncreamed curd, regular creamed curd and curd creamed by the method of the invention:

| Days stored at 45° F. | Uncreamed curd | | | Regular Creamed curd (salted) | | | Curd creamed by method of Invention | | |
|---|---|---|---|---|---|---|---|---|---|
| | pH | $ac^2$ (p.p.m.) | $amc+ac^2$ (p.p.m.) | pH | $ac^2$ (p.p.m.) | $amc+ac^2$ (p.p.m.) | pH | $ac^2$ (p.p.m.) | $amc+ac^2$ (p.p.m.) |
| 0 | 4.68 | 0.50 | 9.1 | 4.99 | 0.30 | 6.5 | 4.94 | 1.6 | 41.2 |
| 4 | 4.66 | 0.58 | 10.6 | 5.05 | 0.34 | 6.7 | 5.00 | 2.2 | 54.4 |
| 6 | 4.68 | 0.50 | 8.9 | 5.05 | 0.34 | 7.4 | 4.98 | 2.2 | 45.6 |
| 8 | 4.69 | 0.52 | 9.5 | 5.02 | 0.38 | 6.8 | 4.98 | 2.4 | 53.6 |
| 11 | 4.65 | 0.52 | 9.1 | 5.03 | 0.34 | 6.3 | 4.92 | 2.8 | 53.4 |

The table shows that the uncreamed curd, and the regular creamed curd contained very little biacetyl. The curd creamed with the creaming mixture of the invention was much higher in biacetyl initially, and the biacetyl content increased with storage for an 11-day period.

The cottage cheese creamed by the method of the invention had much better keeping quality than cottage cheese creamed in the regular manner.

We claim:

1. A method of improving the flavor and keeping quality of creamed cottage cheese which comprises adding to the cottage cheese a substantially pure culture of a citric acid-fermenting organism in a citric acid-containing milk substrate.

2. A method as defined in claim 1 in which the milk substrate is skim milk.

3. A method as defined in claim 1 in which the milk substrate is skim milk and in which cream is added to the culture after substantial completion of the citric acid fermentation.

4. A method as defined in claim 1 in which the citric acid-fermenting organism is selected from the group consisting of *Leuconostoc citrovorum* and *Leuconostoc dextranicum*.

5. A method of producing a flavor enhancing and stabilizing composition for creamed cottage cheese which comprises culturing a substantially pure culture of a citric acid-fermenting organism in a citric acid-containing milk substrate.

6. A method as defined in claim 5 in which the milk substrate is skim milk.

7. A method as defined in claim 5 in which the milk substrate is skim milk and in which cream is added to the culture after substantial completion of the citric acid fermentation.

8. A method as defined in claim 5 in which the citric acid-fermenting organism is selected from the group consisting of *Leuconostoc citrovorum* and *Leuconostoc dextranicum*.

9. A creamed cottage cheese composition containing an added culture of a citric acid-fermenting organism in a citric acid-containing milk substrate.

10. A creamed cottage cheese composition as defined in claim 9 in which the milk substrate is skim milk.

11. A creamed cottage cheese composition as defined in claim 9 in which the milk substrate is skim milk to which cream has been added after substantial completion of the citric acid fermentation.

12. A creamed cottage cheese composition as defined in claim 9 in which the citric acid-fermenting organism is selected from the group consisting of *Leuconostoc citrovorum* and *Leuconostoc dextranicum*.

13. A flavor enhancing and stabilizing composition for creamed cottage cheese comprising a substantially pure culture of a citric acid-fermenting organism in a citric acid-containing milk substrate.

14. A composition as defined in claim 13 in which the milk substrate is skim milk.

15. A composition as defined in claim 13 in which the milk substrate is skim milk to which cream has been added after substantial completion of the citric acid fermentation.

16. A composition as defined in claim 13 in which the citric acid-fermenting organism is selected from the group consisting of *Leuconostoc citrovorum* and *Leuconostoc dextranicum*.

References Cited in the file of this patent

UNITED STATES PATENTS

| | | |
|---|---|---|
| 2,370,879 | Roundy et al. | Mar. 6, 1945 |
| 2,717,212 | Hensgen et al. | Sept. 6, 1955 |
| 2,743,186 | Kraft et al. | Apr. 24, 1956 |
| 2,851,363 | Kielsmeier | Sept. 9, 1958 |